J. GILSON.
BROODER.
APPLICATION FILED JULY 25, 1918.

1,300,951.

Patented Apr. 15, 1919.
3 SHEETS—SHEET 3.

Inventor
Joshua Gilson,
By
Lester L. Sargent
Attorney

UNITED STATES PATENT OFFICE.

JOSHUA GILSON, OF NEBRASKA CITY, NEBRASKA.

BROODER.

1,300,951.

Specification of Letters Patent.   Patented Apr. 15, 1919.

Application filed July 25, 1918.   Serial No. 246,751.

*To all whom it may concern:*

Be it known that I, JOSHUA GILSON, a citizen of the United States, residing at Nebraska City, in the county of Otoe and State of Nebraska, have invented a new and useful Brooder, of which the following is a specification.

The object of my invention is to provide a colony brooder of novel and improved type, which can be manufactured at a low cost and which may be more efficiently and conveniently operated than and with little fuel compared with corresponding devices in the prior art with which I am familiar. I attain the objects of my invention by the mechanism illustrated in the accompanying drawings, in which—

Like numerals designate like parts throughout the several views.

Figure 1:
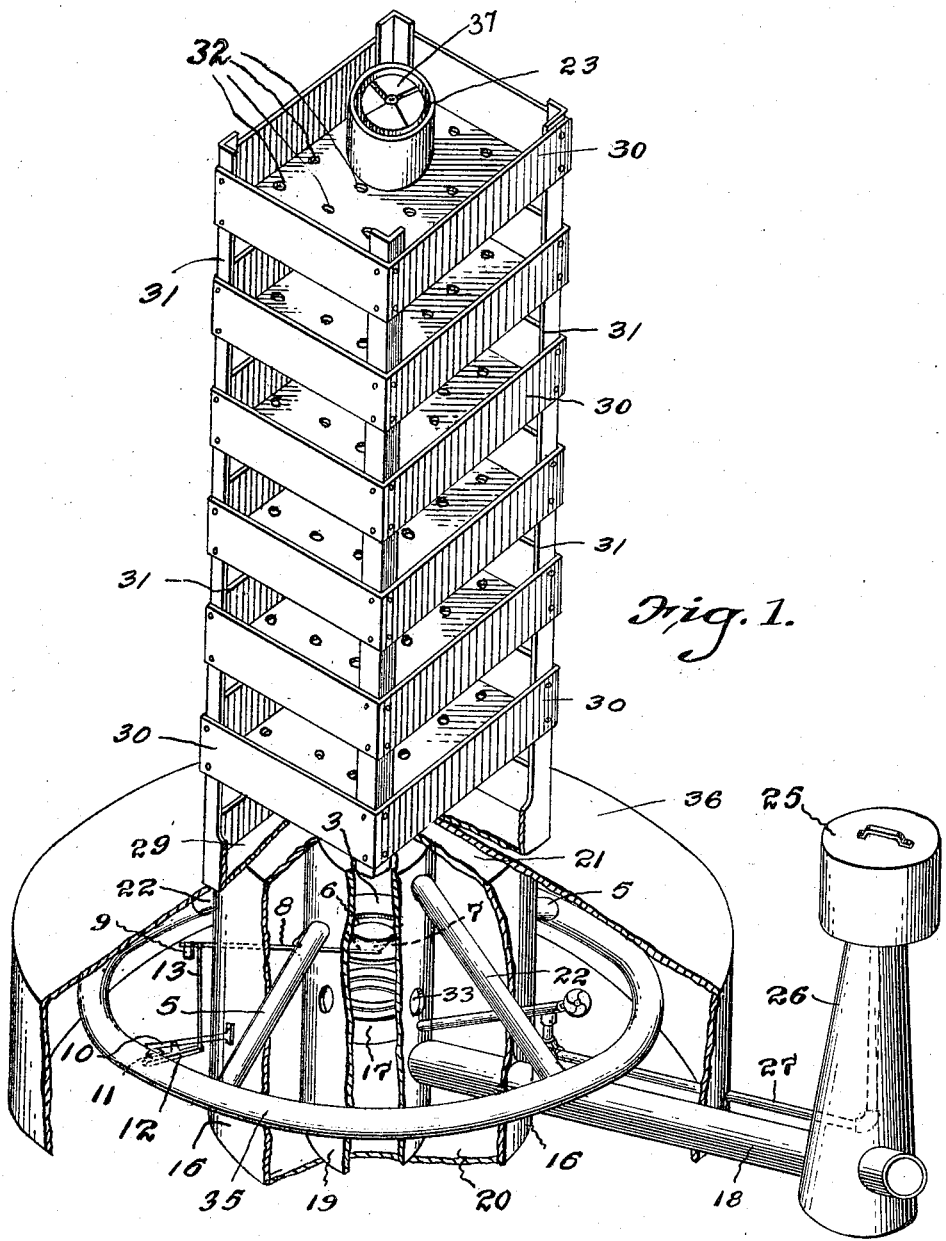
Figure 1 is a perspective of my invention, with part broken away to show the interior construction.

Referring to the accompanying drawings, I provide a suitable stand 26 on which is mounted a suitable fuel tank 25 from which a supply pipe 27 leads to the burner 17. Any suitable burner may be provided. Burner 17 is supported on brackets 34 secured to the stove casing 19. Stove casing 19 is mounted on a suitable baseplate 20, on which there is also mounted a suitable casing 16, within which circulates the cooler air entering through pipe 18 and vent 32, spaced a substantial distance apart from casing 19. A covering plate 21 connects the upper edges of members 19 and 16. Mounted on covering plate 21 I provide a suitable brooder casing 36.

Opening into the lower portion of casing 19, I provide a suitable fresh air intake pipe 18 which is also provided with a cold air vent 32 opening into the jacket or casing 16 surrounding the stove casing and which serves to protect the chickens from the heat of the burner. Spaced above burner 17 I provide a horizontal plate 3 having a central opening 6 which is opened and closed by damper 7. Damper 7 is attached by pivot 14ª to lever 8, on the other end of which is provided an adjustable counterweight 9. Lever 8 is connected by link 13 with thermostat lever 12, the link 13 having a pivotal connection to the members to which it is attached, namely pivot 14. Secured to casing 16 I provide an arm 10, on which is mounted thermostat 11, of any suitable design, and which is operatively connected with damper 7 as above described and illustrated.

Opening radially out of stove casing 19 above burner 17, I provide a plurality of heating pipes 5 which terminate in the annular heating pipe 35 which encircles the outer portion of the brooder chamber and supplies the necessary heat for the brooder. Pipes 5 open out from the stove casing 19 at a point below the horizontal dividing plate 3. Opening into the stove pipe casing 19 above the horizontal dividing plate 3 are return air pipes 22 which extend from the annular pipe 35 in alternate spaced relation to pipes 5, as illustrated in the drawings, the warm air from these pipes thence passes upward to the upright pipe 23 which supplies the necessary heat for the plurality of superposed spaced grain sprouting pans 30, which are supported on the angle iron uprights 31. The bottoms of pans 30 are supplied with suitable perforations 32.

Stove casing 19 is provided with suitable openings 33 in proximity to burner 17 to facilitate combustion. Fuel pipe 27 may be provided with a suitable regulating valve 2. I may provide a suitable stove pipe damper lid 37 of the conventional rotatable segment type.

Figure 2:
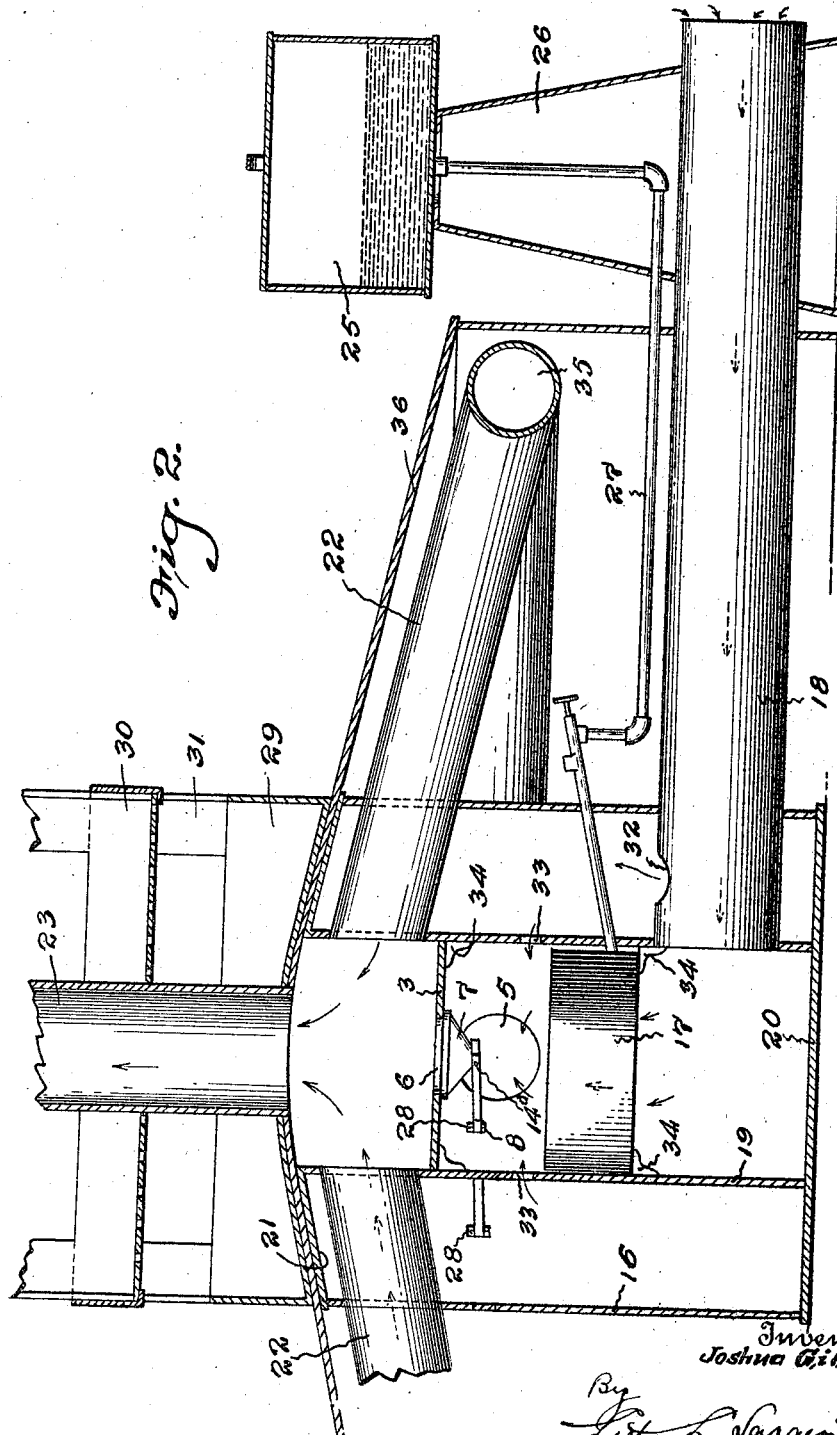
Fig. 2 is a vertical section on line 2—2 of Fig. 4.
Figure 3:
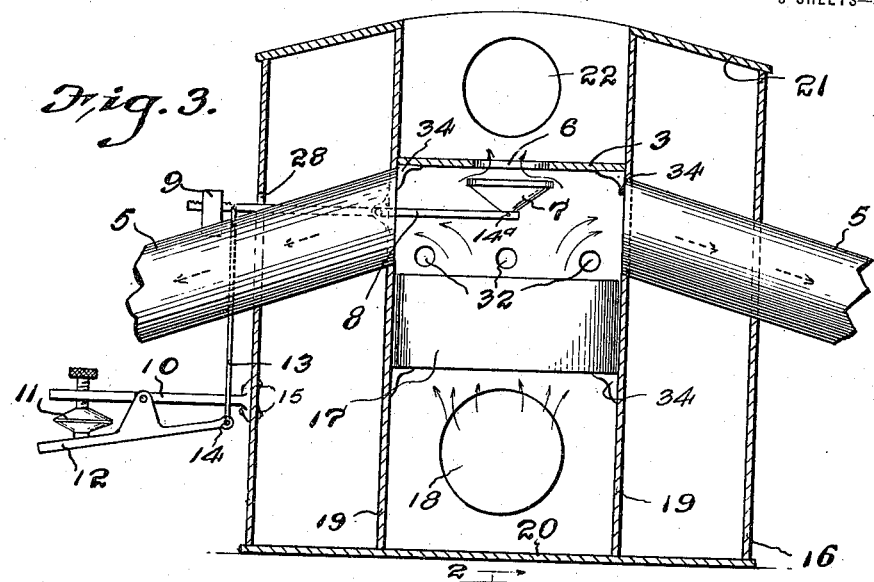
Fig. 3 is a vertical section at approximately right angles to Fig. 2, and on line 3—3 of Fig. 4.
Figure 4:
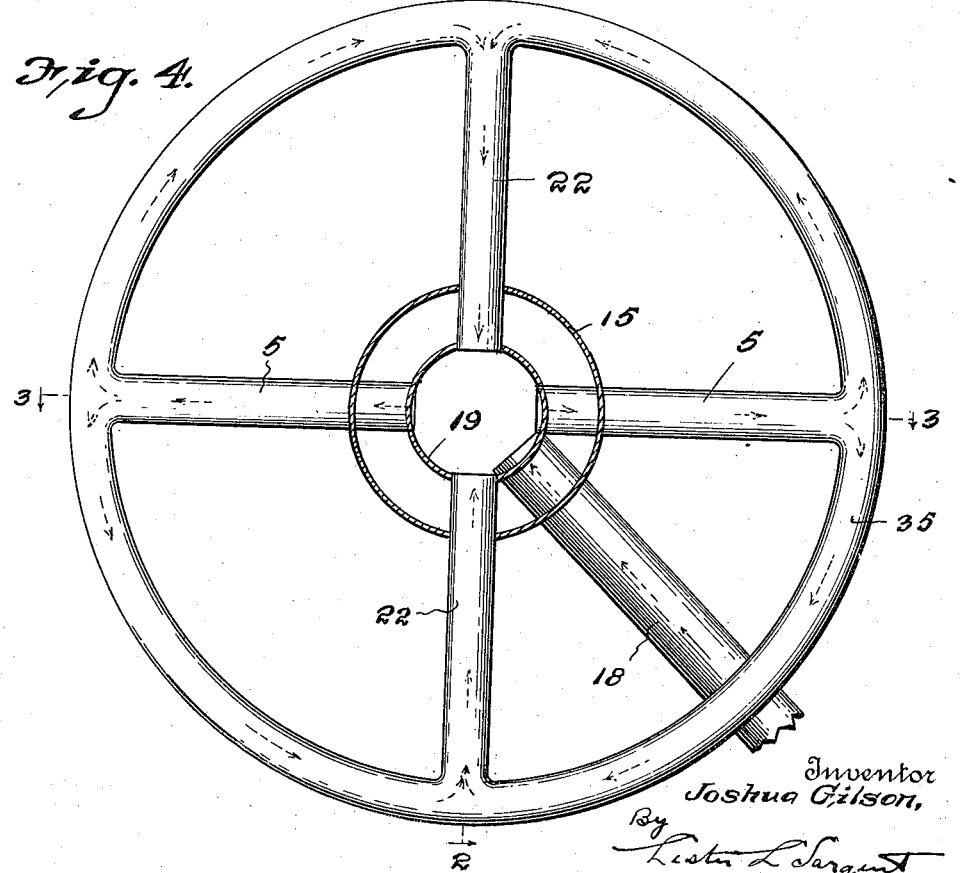
Fig. 4 is a top plan of the brooder heating pipes.

In operation the heated air from the burner is distributed through heating pipes 5 and 35 to heat the brooder chamber, the air then circulating back through return pipes 22 to the portion of the stove casing above the horizontal dividing plate 3, from whence the warm air flows upward through pipe 23, thus providing the grain sprouting pans with heated air that has been used in providing the necessary heat for the brooder chamber. A suitable thermostat in the brooding chamber is arranged to control the operation of the damper which is positioned to close the opening through the dividing plate 3 which is positioned below the connection of pipe 22 to the stove casing 19 and above the connection of pipes 5 to stove casing 19, as shown in Fig. 2.

The pipe 18 supplies fresh cold air to the lower portion of the stove casing and also the cold air jacket surrounding the stove casing. By the arrangement of pipes shown in my brooder the inside brooder is maintained at an even temperature at all times under the automatic control of the thermostat; and an even supply of heat is provided for the grain sprouter, the pans of which are spaced apart a substantial distance so as to provide plenty of fresh air for the grain and to prevent its molding.

The apparatus is easily operated and takes up no more floor space than a brooder alone.

What I claim is:

In a brooder, the combination of a stove casing, a burner in said casing, a source of fuel supply exterior to the brooder compartment and connected with the burner, a brooder compartment surrounding the stove casing and inclosing the heat supply pipes, a second casing spaced from the stove casing and forming a cold air jacket for the protection of the chicks, a cold air supply pipe opening into the lower portion of the stove casing and also into the cold air jacket to cause a continuous draft of fresh cold air into said jacket, a dividing plate spaced above the burner and having an opening therethrough, a damper to open and close said opening, a thermostat positioned in the brooder chamber and operatively connected with the damper to automatically control the opening and closing of the damper at predetermined temperatures, heat supply pipes opening out of the stove casing below the dividing plate, a circulating pipe into which said heating pipes open, return pipes connecting the circulating pipe with the stove casing at a point above the dividing plate for the return of circulated products of combustion, and a pipe for the discharge of said products of combustion.

JOSHUA GILSON.

Copies of this patent may be obtained for five cents each, by addressing the "Commissioner of Patents, Washington, D. C."